(12) United States Patent
Abbot et al.

(10) Patent No.: US 7,760,587 B2
(45) Date of Patent: Jul. 20, 2010

(54) METHODS OF AND SYSTEMS FOR MONITORING THE ACOUSTIC TRANSMISSION CONDITIONS IN UNDERWATER AREAS USING UNMANNED, MOBILE UNDERWATER VEHICLES

(75) Inventors: Philip A. Abbot, Lexington, MA (US); Charles J. Gedney, Sudbury, MA (US); Chris J. Emerson, Manchester, MA (US); David W. Morton, Nashua, NH (US)

(73) Assignee: Ocean Acoustical Services and Instrumentation Systems (OASIS), Inc., Lexington, MA (US)

( * ) Notice: Subject to any disclaimer, the term of this patent is extended or adjusted under 35 U.S.C. 154(b) by 56 days.

(21) Appl. No.: 11/649,635

(22) Filed: Jan. 4, 2007

(65) Prior Publication Data

US 2008/0165617 A1  Jul. 10, 2008

(51) Int. Cl.
*G01S 15/88* (2006.01)
*H04B 1/59* (2006.01)

(52) U.S. Cl. ...................................... 367/131
(58) Field of Classification Search .............. 367/3, 367/5, 6, 13, 117–131
See application file for complete search history.

(56) References Cited

U.S. PATENT DOCUMENTS 5,579,285 A * 11/1996 Hubert .................. 367/133

OTHER PUBLICATIONS

Zoksimovski, A. and C. de Moustier, "Detection of Direct-path Arrivals for Multi-Narrowband Sequences (3-30 kHz) In Shallow Water", High Frequency Ocean Acoustics: High Frequency Ocean Acoustics Conference, AIP Conference Proceedings, vol. 728, Nov. 2004, pp. 478-488.*
Abbot, P., Gedney, C., Morton, D. And Emerson, C., "Mobile Acoustic Source for Underwater Acoustic Measurements," Presented at OCEANS 2006, IEEE, Sep. 21, 2006, Boston, MA (Paper No. 060424-01).

* cited by examiner

*Primary Examiner*—Dan Pihulic
(74) *Attorney, Agent, or Firm*—McDermott Will & Emery LLP (57) ABSTRACT

A method of and system for monitoring the acoustic transmission conditions in underwater areas using an unmanned, mobile, submersible vehicle of the type including a source of acoustic signals. The submersible vehicle is controlled so that the vehicle traverses a desired path through the water of an area of interest. As the submersible vehicle traverses the desired path, a time-synchronized acoustic signal is transmitted from the acoustic source to at least one receiver spaced from the submersible vehicle so as to generate data representing the acoustic properties of the environment in the water between the acoustic source and the at least one receiver as the submersible vehicle traverses the desired path.

42 Claims, 6 Drawing Sheets

METHODS OF AND SYSTEMS FOR MONITORING THE ACOUSTIC TRANSMISSION CONDITIONS IN UNDERWATER AREAS USING UNMANNED, MOBILE UNDERWATER VEHICLES

STATEMENT REGARDING FEDERALLY SPONSORED RESEARCH

This invention was made with US government support under Contract Nos. N00014-05-C-0208 and N00014-04-D-0570 awarded by the Office of Naval Research to the assignee hereof. The government has certain rights to the invention.

FIELD OF THE INVENTION

The present invention relates generally to underwater acoustic ranging systems, (for ocean or sea or other water bodies) being more particularly concerned with the continual measuring of the range between an acoustic source mounted on an unmanned undersea vehicle (UUV) or autonomous underwater vehicle (AUV) and preferably a plurality of remotely deployed and spaced, synchronized underwater hydrophone receivers. In determining such range, the system can then be used to measure the acoustical properties of the ocean environment, such as transmission (or propagation) loss (TL), channel impulse response, and bottom geoacoustic properties. It can also be used to measure properties of the target/receiver system, such as source level, receiver sensitivity calibration, sonar (receiver) system performance and sonar operator readiness, depending upon specific applications of the source vehicle. Further, in situ measured data can be assimilated with models to enable more accurate prediction of the ocean environment than could be obtained from either individually.

BACKGROUND OF INVENTION

The art is replete with prior uses of sonar ranging equipment carried by manned surface or submarine vessels for underwater detection of moving and stationary underwater targets or objects, including depth and fish finders and the like, wherein the acoustic pulse or other transmitter source is co-located adjacent an onboard acoustic receiver and its target range displays of the received echoes from such targets.

An example of such systems with co-located sound source and receiver for determining the position of a target vehicle (range and azimuth angle) is shown in later-discussed FIG. 3b. This method is used by many of the active sonar systems in the navies of the world, as described, for example, in *Principles of Underwater Sound*, Urick, Robert J., McGraw Hill Book Company (1975), and also in commercial side-scan sonar systems, and the like. In this method, a sound source is co-located with the receiver system (typically the receiver is a hydrophone array). A specialized signal is transmitted into the water. The received signals are filtered so that the reflections from underwater objects are amplified and noise is reduced. The delay between the source transmission time and the time at which the reflected signal is received by the array is combined with the known sound speed to determine the range to the vehicle. The received signals are also processed to determine the azimuth angle or bearing to the vehicle. The method uses the time delay between the (synchronized) sound source transmission and the received reflection (along with the known sound speed) to determine range; however, the sound source is co-located with the receiver and not on board the target vehicle, a different configuration from the present invention. This method may also be used with the sound source and the receiver array located in different positions.

The present invention, however, is not concerned with such ranging configuration systems, but rather with very different configurations wherein the acoustic transmitter is carried by unmanned (or autonomous) UUV or AUV type underwater vehicles, acoustically interactive with remotely positioned hydrophone or similar acoustic receivers (all hereinafter generically referred to as "hydrophones") that have been deployed, as on sonobuoys and the like, in predetermined patterns and remotely from the vehicles.

Other types of systems than the present invention, however, have also employed predetermined patterns of hydrophone receivers for determining the position (x-y-z coordinates) of a vehicle operating in an underwater acoustic range, as described, for example, in Gunderson, Charles R., "The History of the Naval Torpedo Ranges at Keyport," NUWC Div. Keyport Report No. 2254, Keyport, Wash., August 1998. These methods, also later described in connection with FIG. 3c, are of two types; long baseline (LBL) and short baseline (SBL), depending on the particular geometry of the hydrophone receivers and the resulting equations used to compute the vehicle position. They are of two classes; synchronous source (SS) and asynchronous source (AS), depending upon whether the sound source is synchronized with the receiver processing system or not. For such acoustic test facilities, the precise locations of the fixed hydrophone system must be known, a-priori. The receiver system consists of several hydrophones placed at fixed locations (a minimum of 2-4 hydrophones are needed, depending on the method used), typically along the sea floor. Signals from these hydrophones are recorded and processed by the appropriate systems. A sound source (sometimes called a projector) is placed in the vehicle and, depending on whether the SS or AS method is to be used, may need to be synchronized with the receiver system before deployment of the vehicle. The projector periodically transmits or emits a special signal that is detected by the hydrophone system. The hydrophone processing system computes the time at which the signal arrives at each hydrophone. In the SS method, range is computed directly from the time delay between the known source transmission time and the arrival time. In the AS method, range is inferred from the differences in the signal arrival times at several hydrophones in predetermined locations.

Such test range AS methods, however, are different from the present invention in that: the source in the vehicle is not synchronized with the receiver system, whereas the invention uses a synchronized source. The receiver hydrophones, moreover, must be fixed at precisely known positions, whereas the invention may use hydrophones or hydrophone array receivers attached to drifting buoys or moving vehicles containing GPS receivers. The AS technique is only applied to determine the vehicle location, whereas the invention uses the projector signal to make additional acoustic measurements (TL, bottom loss, sonar calibrations, etc) and/or for target training.

While the SS methods may use a source contained in the vehicle that is synchronized with the receiver system before deployment, they are not adapted for or used with drifting buoys or moving vehicles containing GPS receivers, nor do they make such additional acoustic measurements.

This is further described in Cecil, Jack B., "Underwater Hydrophone Location Survey", Proceedings of the Precise Time Interval Systems and Applications Meeting, Vol. 24, No. 15, 1992. The synchronized sound source was suspended from a surface ship whose position was monitored via radar. The time delay between the source transmission and the received signals was used to determine the unknown range to a set of bottom-mounted hydrophone receivers. While the range calculation was similar to that used in the present invention, the source was located in a fixed surface ship and not a mobile underwater vehicle, with its different operational characteristics.

Another approach for tracking underwater vehicles is known as the GPS Intelligent Buoy (GIB) system of U.S. Pat. No. 5,579,285, also described in Bechaz, C. and Thomas, H., "GIB Portable Tracking Systems—the Underwater Use of GPS," *Hydro International*, 2002;

Thomas, H., "GIB buoys: An interface between space and depths of the oceans," in *Proceedings of IEEE Autonomous Underwater Vehicles*, Cambridge, Mass., USA, pages 181-184, Aug. 1998; ORCA ACSA. Trajectographe GIB Manuel Utilisateur, 1999.

Such is represented in later-discussed FIG. 3c, using a GPS time-synchronized source, attached to the underwater vehicle, to produce high frequency pings (8 to 50 kHz) at precise intervals. The pings are received by a set of hydrophones attached to buoys on the water surface (usually four) that are also equipped with GPS systems to locate the buoys and provide an accurate clock. The acoustic propagation time delays are measured to each buoy from the source vehicle. The ranges from each buoy to the vehicle are estimated by assuming the sound speed. The vehicle position is then determined from the known buoy positions and the estimated ranges. This system also uses a second ping (transmitted after the initial ping) to provide the depth of the vehicle. The GIB system operates at high frequencies and has been used for tracking underwater objects with the externally attached synchronized pinger at ranges less than 3 km. This system is adapted to be used solely for tracking underwater objects and is not adapted to be used for determining any of the other acoustical purposes as in the present invention, such as the measurement of TL or bottom loss measurements, sonar calibrations, and/or for target training. Although only hydrophone receivers are used (no arrays), the GIB system relies on the same basic principle to determine the range to the vehicle as is used in the current invention (time delay from a synchronized source in the vehicle and an assumed sound speed). The present invention, however, is a low frequency (200 to 2,000 Hz) system that tracks the underwater vehicle to much greater ranges (ranges up to 20 and even 50 km have been demonstrated), and additionally provides simultaneous acoustic measurements and/or training capabilities with the calibrated acoustic source that is integral within the UUV and not externally attached to it.

In contrast to these prior techniques, the present invention is specifically designed also to measure important acoustical properties of the ocean. The system, as before stated, is comprised of an acoustic source mounted on an underwater AUV or UUV vehicle or the like, and hydrophone receivers, deployed in the ocean, as by floating buoys, and separated or remote from the vehicle. Prior to launch, the vehicle is programmed to: i) run a series of defined tracks (e.g. opening, closing, circling, changing speed and/or depth) and ii) transmit specialized acoustical waveforms that, upon signal processing, provide range from the vehicle to the receiver and other acoustical properties (e.g. transmission loss or the channel impulse response). The vehicle and receivers have internal clocks that are time-synchronized. After the source transmits the waveforms, the time delay to the receiver is measured by utilizing matched-filter processing. The range from the source is determined by the product of the sound velocity and the measured time delay. This process is continually periodically repeated, preferably once per minute, and the range is measured in close to real time throughout the duration of the system run plan.

Details as to the AUV or UUV programming and operation are presented, for example, in U.S. Pat. Nos. 5,666,900; 5,600,087; 5,537,947; 5,490,573; and 5,487,350.

OBJECTS OF THE INVENTION

An important object of the invention, accordingly, is to provide novel underwater ranging methods, techniques, and systems that, unlike the above-mentioned prior art underwater ranging approaches, shall be particularly adaptable to measure underwater propagation characteristics, such as sound transmission loss (TL) as in shallow water and at ranges typical for tactical sonar systems and the like.

Another object is to provide in such novel systems, for the suitable acoustic source and receiver(s) calibration, definition of the source transmission signal, and software required for processing the received signals and for determining the range and bearing from the source to the receiver(s) in near real time.

A more general and underlying object is to provide a novel substantially real-time ranging capability that expands the usefulness of the invention beyond such TL measurements to other applications, as well, including the measurement of geoacoustic properties of the seafloor, sonar operator training, sonar system calibration, in-situ sound pressure level measurements of unknown target sound sources, and/or to provide inputs for model/data assimilation purposes among other applications.

Other and further objects will be explained hereinafter and are more particularly delineated in the appended claims.

SUMMARY OF THE INVENTION

In summary, from one of its important deployment applications, the invention embraces a method of continually measuring the range between an acoustic source integrally mounted within an unmanned or autonomous mobile undersea vehicle and one or more hydrophone acoustic receivers deployed in the sea remotely from the vehicle, that comprises, programming the vehicle to run predetermined tracks in the sea;

time-synchronizing the transmission of such periodic signals with the receivers;

transmitting predetermined periodic acoustical signals from the source during such run;

measuring the time delay of the signal transmission to the receivers through signal processing;

determining the range from the vehicle source by the product of the sound velocity in the sea and the measured time delay; and periodically repeating such transmitting, measuring and determining, to enable the range to be measured in close to real time throughout the duration of the vehicle run.

The invention thus provides a system and method for calibrating and deploying a sound source on a small autonomous underwater vehicle (AUV), calibrating and deploying a synchronized receiver or plurality of receivers to measure the sound radiated by the sound source, and suitably processing the received signals to locate and track the sound source and compute the desired sound characteristics (TL, impulse response, bottom geo-acoustic properties). In addition, the invention can provide input for model/data assimilation systems and can provide a means for in situ sonar calibration/ training parameters).

In development of this method, Lockheed Martin Sippican (LMS) EMATT and SUBMATT AUVs have been used since these vehicles already incorporate sound sources, and are already used as training targets and can be preprogrammed to run (via dead-reckoning) in a desired track. The software and hardware included with these vehicles has been modified to include a very precise clock (<10 ppm accuracy) which is used to broadcast specialized waveforms at precisely 1 min intervals. The software was also modified to allow the storage of specialized waveforms with lengths of up to 20 seconds in the onboard memory of the vehicle. Various receivers have also been chosen over the course of developing the system and processing method, including omni-directional and gradient (DIFAR) sonobuoys, bottom mounted horizontal and vertical arrays, and submarine sonar arrays. Specialized software is provided to process the received signals to calculate range and bearing from the receiver(s) to the AUV in near real time, and to calculate the desired acoustical properties.

Preferred and best-mode designs will hereinafter be described in detail.

BRIEF DESCRIPTION OF THE DRAWINGS

The invention will now be described in connection with the accompanying drawings in which;

FIGS. 3a, 3b and 3c are similar previously referenced diagrams of three prior art acoustic ranging systems embodying some components similar to components of the present invention, but configured and operated differently, and herein shown for purposes of distinguishing from the operation of the invention, and with FIG. 3a showing a bottom-mounted array receiver system for use with an asynchronous acoustic source.

FIGS. 11, 12 and 13 present experimental test results with the invention, FIG. 11 showing a comparison of system range and bearing measurements (without triangulation) with independent measurements of a SCORE (later defined) range tracking system.

DESCRIPTION OF PREFERRED EMBODIMENT(S)

Before proceeding to a description of preferred embodiments of the invention as portrayed in the drawings, it is believed to be helpful to describe the choice of specific components preferentially selected in the implementation and experimental testing of the invention.

Introductory Setting

As for the type of previously developed AUV or UUV for the practice of the invention, and with which the experimental results hereinafter presented have been obtained by the assignee of the invention, Ocean Acoustical Services and Instrumentation Systems (OASIS), Inc of Lexington, Mass., the system preferentially uses the before-mentioned Lockheed Martin Sippican (LMS) Expendable Mobile ASW (Anti-Submarine Warfare) Training Target (EMATT) particularly well-suited as the source vehicle. The baseline EMATT has been modified, however, to fulfill the requirements of the current system of the invention. First, a very accurate clock (with deviation of less than 10 ppm) has been installed on the vehicle. Second, onboard vehicle software was modified to allow the uploading and transmission of specialized wave forms. The source projector for each vehicle, moreover, is calibrated to accurately determine its source level and directivity.

The system of the invention may also utilize a source mounted on a recoverable vehicle, such as REMUS vehicles, manufactured by Hydroid Inc., Falmouth, Mass., and other suitable vehicles, as well.

Different hydrophone receivers have been used as necessitated by different acoustical applications. Typically, sonobuoy hydrophone receivers (e.g. omni-directional, gradient and horizontal array types) and bottom-mounted hydrophone arrays have been used as receivers. The system has also been used onboard a US Navy submarine, using the LMS SUBMATT (Submarine Mobile ASW Training Target) and various sonar receivers onboard the submarine. In all cases, however, in accordance with the invention, the clocks on the receiver system are time synchronized with the clock on the source vehicle prior to launch so that accurate measurements of the time delay from source transmission to reception can be made.

The novel system and methodology of the invention in its most practical configuration, however, measures the range from an underwater vehicle to a plurality of normally remotely distributed hydrophone receivers, using time-synchronized signals transmitted to the receivers from an acoustic source mounted on the moving vehicle. The system measures the time delay between signal transmission and reception by matched-filter processing specialized waveforms transmitted by the source. The range from source to receiver is given by the product of the measured time delay and the sound velocity. The preferred system configuration is comprised of a mobile acoustic source within an expendable or recoverable unmanned undersea vehicle, a plurality of sonobuoy-suspended hydrophone receivers, and signal processing software that calculates a variety of output data, including vehicle range and acoustic transmission loss from source to the receiver(s). When utilizing receivers with horizontal aperture (e.g. fixed or towed horizontal line arrays or directional sonobuoys), the system can calculate vehicle bearing as well and therefore track the vehicle in near real time. Along the propagation paths from the source to the receiver(s), the system can be used to measure: transmission (or propagation) loss (i.e. channel impulse response) and bottom geoacoustical properties; and its specialized waveforms enable use in training naval sonar operators in anti-submarine warfare (ASW), whereby the actual position of the source target is directly known from the system, thereby providing the operator with a means to verify onboard sonar sensors that estimate the position, and to determine, in-situ, the detection range to the training target.

TL Measurement And Other Uses

Though each application of the system of the invention may be different (due to the number of receiver types and launch platform for the source), the software that processes the received signal is common from one system to another. Range to the source vehicle from each of the receivers is obtained by measuring the time delay between each signal's known transmission time and its arrival at the receiver. Because the acoustic source level is known (through calibration) and the received sound pressure levels at the receivers (whose sensitivities are also known through calibration) are measured for each transmission, TL can be obtained in real time. When the receivers have horizontal aperture, bearing of the source vehicle is also measured. Given range and bearing, the actual track of the source vehicle is determined and displayed in real time (along with the TL measurements) via the system software.

The invention has been specifically used to measure transmission loss, channel impulse response of an ocean environment and bottom geoacoustical properties. The invention has also been used as an ASW target training system with real-time, in-situ ranging provided to the operator as a ground truth tool for validating onboard sonar system performance. The actual range from the source vehicle to the receiver as measured by the system is the ground truth by which other ranging sensors can be validated. The invention has also been used to determine a given receiver sensitivity by knowing the range from the source to the vehicle, the source level radiated, and the received voltage level. The invention has also been used to provide inputs for model/data assimilation whereby in situ data are assimilated with acoustic models to enable more accurate prediction of the ocean environment than could be obtained from either individually.

The invention was, indeed, developed in response to an observed need in the acoustical community in connection with its recent interest in the propagation of sound in shallow water (littoral) regions of the oceans of the world. This is due in large part to the increased use of sonar systems in these areas for surveillance, tracking and identification of both surfaced and submerged vehicles. In these littoral regions, many complex oceanographic and bottom geological phenomena such as internal waves, fronts, eddies, bottom rock outcrops and sediment pools affect the propagation of sound. Some researchers have employed bottom mounted acoustic sources and receivers to measure sound propagation (TL) in these regions. These systems are used to measure and track the changes in TL over time, as the oceanographic conditions change. Such measurements are used in turn to validate complex models of the ocean. These systems are excellent at providing the temporal variations in TL over time at a fixed location, but do not provide any insight as to the spatial variations in TL as the source and/or receivers are moved, or as to the temporal variations in TL at other locations. Sonar systems are quite often mounted to moving platforms with their receiving sensors set to variable water depths and, therefore, the spatial variations in TL are also important.

Other researchers have taken a different approach to this problem. Full scale sea trials are quite often conducted to test sonar equipment in littoral regions, this also providing a unique opportunity to conduct scientific measurements of the sound propagation in these areas. The sonar equipment includes both sound source and receiver systems operating from both surface and submerged mobile platforms (naval ships). In addition, moored and drifting sources and receivers such as sonobuoys can often be deployed to augment the sonar equipment. The Site-Specific SHAREM (Ship ASW Readiness and Effectiveness Measurement) Program is an example of such a sea trial program conducted jointly by the US and foreign navies. Scientific studies of the sound propagation measurements conducted during these trials offer a valuable opportunity to measure TL in littoral regions, but require a large commitment of naval manpower and assets, resulting in a high cost with inflexible schedules and test locations, which are now all obviated by the present invention.

Due to these and other problems, it became clear that an inexpensive, reliable mobile underwater acoustic source and receiver system and method would be invaluable to this research to measure TL at low cost and to be deployed quickly and easily from a variety of ocean-going platforms. The source itself must radiate a calibrated, repeatable signal with a high enough intensity to make it useable at ranges typical for tactical sonar situations, and it would also need a tracking system so that its range and bearing relative to the receiver may be determined at any time during its deployment.

System Configurations and Test Results

It is now in order to describe the system configurations and methods of operating the same.

Figure 1:
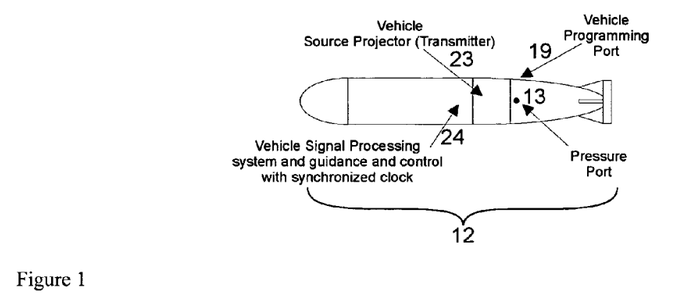
FIG. 1 is a side elevation of a suitable mobile underwater internal acoustic source AUV or UUV vehicle for use in the system of the invention, shown as of the modified LMS EMATT type above and later referenced.

As before-described, the system basically consists of a pre-programmable mobile underwater acoustic source 23 located inside an unmanned autonomous undersea vehicle (UUV or AUV) 12, such as the EMATT made by Lockheed-Martin/Sippican (LMS) as shown in FIG. 1, and a receiver system. In the present system, the source vehicle 12 is propeller-driven and is about 4' long and 5" in diameter. It is powered by either of two different battery packs (lithium sulfate or alkaline) depending on the application (surface-launched or submarine-launched). The current system uses upgraded LMS EMATT and SUBMATT units, but the unique aspects of the system identified in this application can also be adapted for use on AUV's from other manufacturers.

The acoustic source projector or transmitter 23 is a circular ring transducer located within the body of the vehicle 12. The onboard Guidance and Control (G&C) module 24 also contains a highly accurate and repeatable clock, preferably with an accuracy greater than 10 ppm. This is necessary in order to ensure that the specialized acoustic waveform required herein is broadcast at precisely, say, 1 minute intervals.

Prior to at-sea testing, the source projector 23 for each vehicle 12 is, for the preferred purposes of the invention, calibrated over frequencies from about 100 to 2000 Hz by acoustic engineers—for example, in a US Navy Underwater Acoustics Facility (ISO-9001 compliant). This is done to determine the vehicle projector source level and directivity. Recent calibration tests on a modified LMS EMATT, as an illustration, determined that the source level of the projector 23 peaks at about 152 dB re 1 µPa @ 1 m at a frequency of 1,100 Hz. During one test, the radiated noise spectrum of the moving vehicle 12 was measured while spinning a drag disk at the equivalent of 3 m/s (6 knots) advance speed. The corresponding noise radiated from the operating mechanical sources (motor, shaft, actuators, etc.) above 400 Hz is at least 50 dB below the levels generated by the projector 23. The source 23 was determined to be nearly omnidirectional in both the horizontal and vertical planes for frequencies below 1,500 Hz.

The acoustic pulsing or ping-to-ping variability for each vehicle 12 is small (<0.25 dB). Comparisons between vehicles 12 at broadside on the horizontal plane have shown repeatability in the mean to <1 dB. The source level sensitivity to the vehicle 12 battery load over time has also been tested. The level was constant (within 0.5 dB) over a four-hour test cycle and the acoustic source 23 properly scuttled at the design voltage shut-off level.

Turning to the hydrophone or similar receiver, depending on the goals of the specific deployment, the configuration of the receiver system can vary significantly. Possible configurations include a single receiver, a plurality of receivers, an array of receivers or a submarine-based array receiver.

Figure 2A:
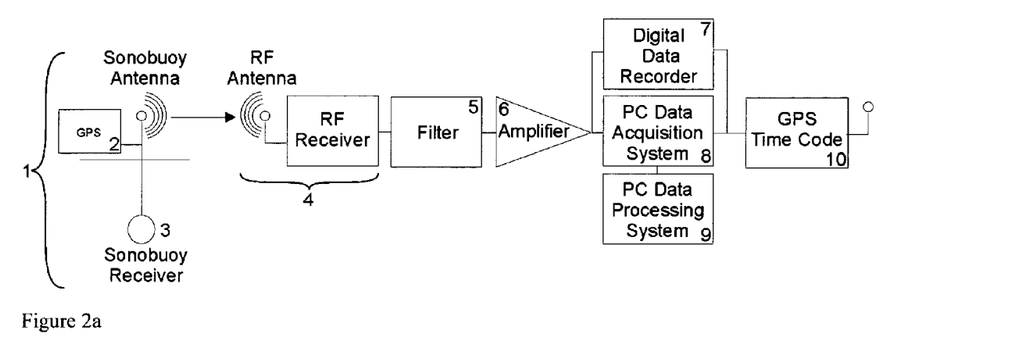
FIG. 2a is a schematic diagram illustrating the use of a remote single floating GPS-located sonobuoy hydrophone acoustic receiver communicating by an above-surface data relaying antenna with a radio-frequency receiver station provided with a processing system.

In FIG. 2a, an overall single receiver system is illustrated, consisting of a floating sonobuoy-suspended hydrophone acoustic receiver 3, a GPS receiver 2, a radio-frequency transmitter unit 1 for relaying hydrophone-signal data from an above-the-water antenna to a receiving and processing and recording station. GPS data may be recorded at the receiver location or transmitted along with the acoustic signal to the RF receiver 4. At the processing and recording station, there is provided an RF receiver 4, a filter 5 and amplifier 6, a PC-based data acquisition 8 and processing systems 9, a GPS receiver 10 and a digital recorder 7. The acoustic signal is received by the sonobuoy acoustic receiver 3 and transmitted via RF relay to the RF receiver 4. From there the signal is filtered and amplified (or attenuated) and sent on to the recording systems 7, 8. The time series output from the amplifier 6 and the GPS time code are continuously recorded by the digital recorder 7. They are also digitized and saved to the hard drive of the PC-based data acquisition system 8 in data files that have a user-defined length. The start-time of the file is time-synched to the vehicle 12 such that the data begins, say, five seconds prior to the vehicle 12 signal transmission. The data processing PC 9 is networked to the data acquisition system 8. This enables it to access the saved, digitized data on the data acquisition system's 8 hard drive. The output of the processing system 9 includes data such as TL, range (calculated from the difference between the transmission time and the reception time using a nominal sound speed), bearing (if a directional receiver is used), and the mean and statistical distribution of the noise. Post-processing, using the position data obtained from the GPS unit 2 attached to the sonobuoy receiver 3 in combination with range and bearing data, provides the latitude and longitude position of the vehicle 12 at any point during its underwater mission.

Figure 2B:
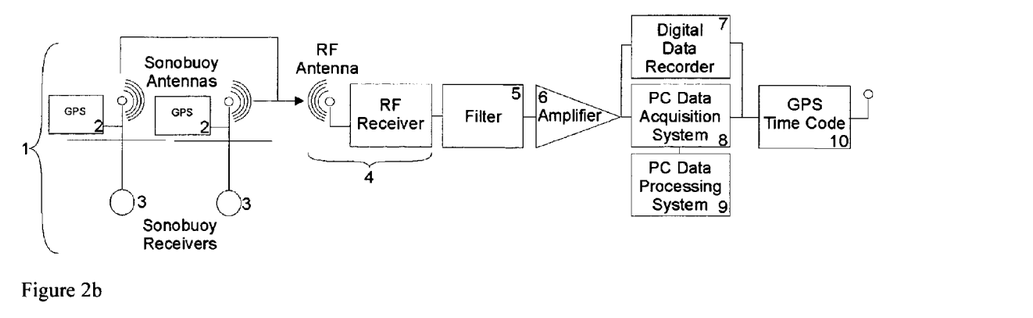
FIG. 2b is a diagram similar to FIG. 2a but using a pattern of a plurality (shown as two) of remote spaced sonobuoy hydrophone acoustic receivers and relaying antennas.

FIG. 2b shows the same type of system in a multiple receiver configuration. This configuration is similar in most respects to the single sonobuoy receiver system shown in FIG. 2a but with two significant differences. First, multiple sonobuoys receivers 1 are used. To date, up to four receivers have been used at any one time; but, in principle, more could be used. Second, during post-processing, the vehicle position data from each separate sonobuoy can be reconciled to produce a more accurate estimation of vehicle position than that produced by the individual sonobuoys.

Figure 3A:
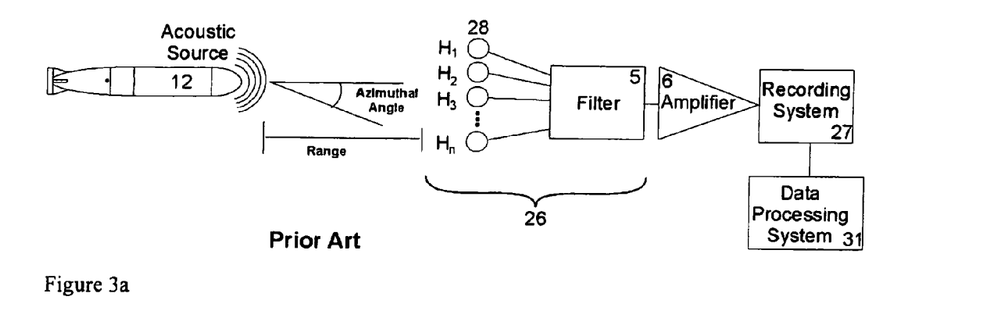
Figure 3B:
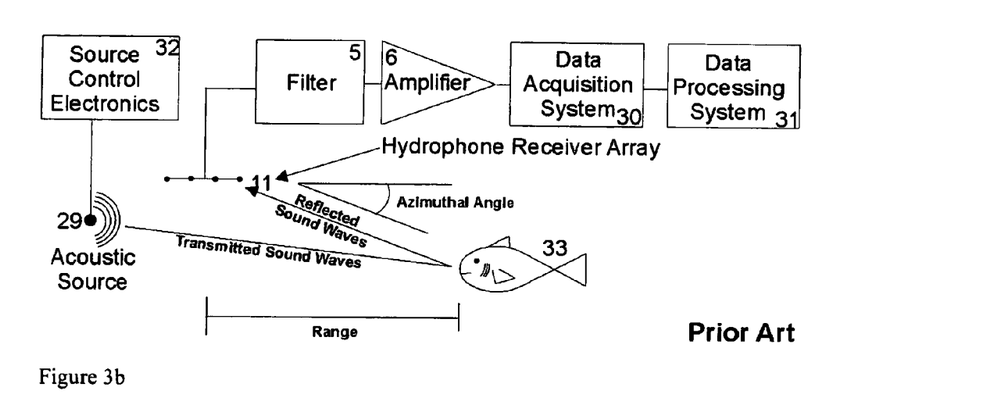
FIG. 3b, a monostatic active sonar system with a co-located sound source and receiver array.
Figure 3C:
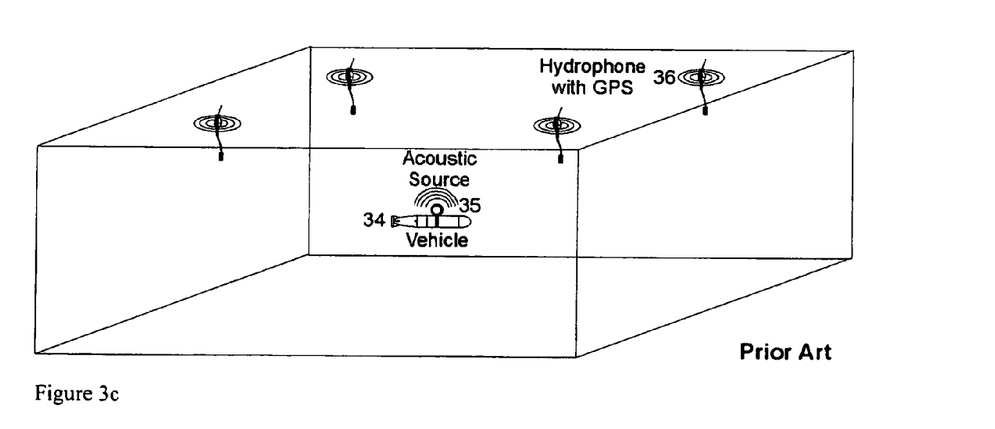
FIG. 3c a GPS intelligent buoy system (GIB) using a synchronous source (SS)

This is to be contrasted with the previously described prior art arrangements of FIGS. 3a, 3b and 3c. In FIG. 3a, a bottom-mounted array receiver system 28 ($H_1$-$H_n$) is shown adapted for use with an asynchronous (AS) source at the vehicle 12. FIG. 3b illustrates a prior mono-static active sonar system 32-29-11 with co-located transmitting sound source 29 and hydrophone receiver array 11; and FIGS. 3c, the earlier described prior GPS intelligent buoy system GIB with a synchronous source (SS) 35 and distributed GPS-equipped hydrophones 36—all earlier contrasted from the configurations and operation of the present invention.

Figure 4:
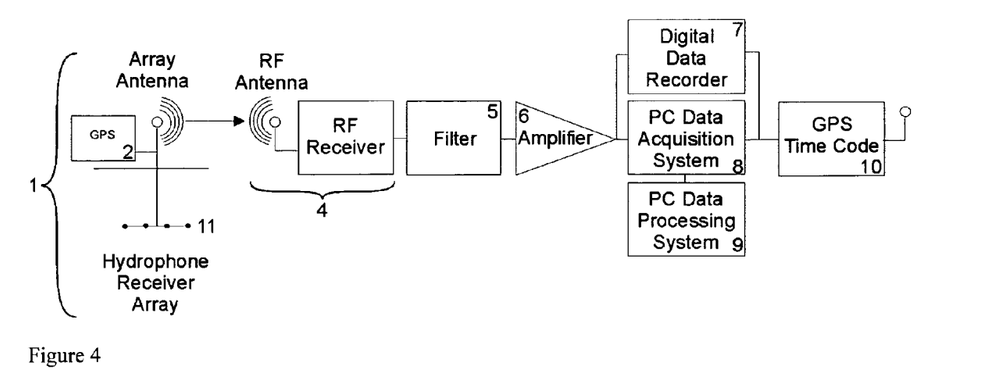
FIG. 4 is a diagram similar to the GPS-located sonobuoy embodiment of FIG. 2a, and operating with a sonobuoy-suspended hydrophone receiver array.

The system of the invention takes on a third configuration, shown in the embodiment of FIG. 4, wherein the receiver is also in the form of an array of hydrophones 11. The hardware for this configuration is the same as that used for the plurality of hydrophones of FIG. 3. Upstream of the processing PC 9, the array data are simply treated as separate hydrophone channels, with the data acquisition system 8 and the digital recorder 7 configured to record element-level time series data. The difference occurs at the data processing system 9, where a beamformer is written into the processing code to determine the bearing of the vehicle 12.

Figure 5:
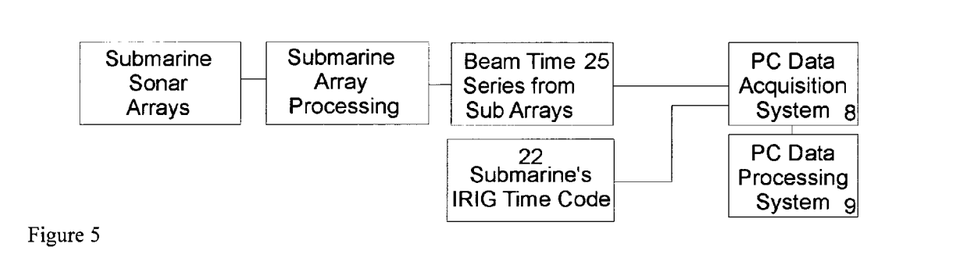
FIG. 5 is a schematic block diagram of a further modification wherein the system receiver comprises a submarine array and uses the submarine's IRIG time codes.

The invention may also be deployed from a submarine. In this scenario, the acoustic arrays of the submarine act as the receiver end of the system. This configuration is shown in FIG. 5. The data acquisition PC 8 is interfaced with the submarine array processor at the point of the output of the beamformer. Beamformed time series 25 are saved to the data acquisition PC hard drive 8, along with the IRIG time code 22. The processing PC is used to compute and display data information such as range, bearing and TL in near real time.

Figure 6:
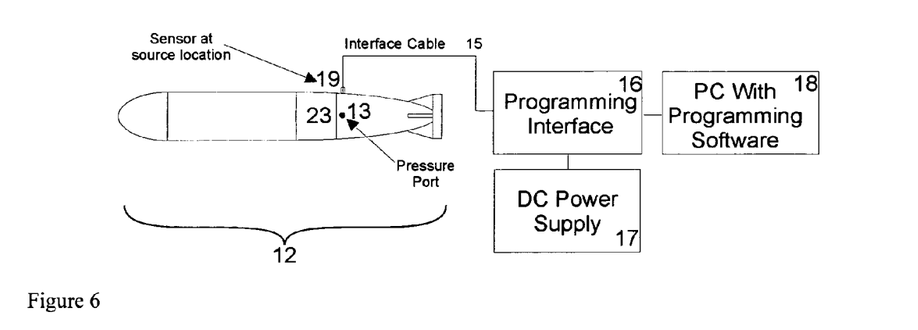
FIG. 6 illustrates the acoustic source vehicle programming configuration.

Deployment begins with programming the mobile acoustic source 23. The vehicle 12 programming configuration is shown in FIG. 6. A DC power supply 17 provides power to the vehicle 12 through the programming interface 16. A PC 18 is networked with the vehicle 12, also through the programming interface 16, connecting with an interface cable 15 through the vehicle programming port 19. The PC 18 is equipped with a modified version of LMS's vehicle programming software, developed for the EMATT vehicle, as more generally described in the earlier cited patents. This software allows users to define both the run geometry and the acoustic signals transmitted. The run geometry is defined on the main page of the vehicle programming software for each of, for example, 12 selectable positions of the run position switch. Users may input the depth, magnetic course, speed and duration, in minutes, of each leg of a given run geometry, as is well known. Up to 42 legs can be defined, so the run geometries can be fairly complex. The acoustic signals are defined on a separate page of the software. Users may specify up to, for example, ten different WAV files that are to be downloaded to the vehicle (this part of the programming software incorporates modifications made to the base line EMATT programming software). Each WAV file in such modification is two seconds in duration and is sampled at 44.1 kHz. The WAV files give users the opportunity to download and subsequently transmit any acoustic signal desired. Hyperbolic frequency modulated sweeps are effective as they are Doppler insensitive, and can have a large frequency bandwidth, giving them a high time resolution after matched-filter processing. Constant frequency signals (CWs) have also been employed. Other possibilities include pseudorandom sequences and mimicking local biologic sources in an effort to preserve stealthiness—or to mimic the acoustic characteristics of certain underwater vehicles (such as submarines) as is done in LMS's EMATT vehicle, more particularly outlined in earlier cited U.S. Pat. No. 5,666,900.

Users may also define a number of CWs and their source levels. These may be transmitted simultaneously during the time (40 seconds each minute) that the WAV files downloaded to the vehicle are not active. Finally, users also have the option of defining a broadband noise spectrum and source level. This signal will also be transmitted during such 40 seconds each minute when WAV files downloaded to the vehicle are not active. The vehicle 12 may also have a high frequency MK84 pinger that transmits standard short or long K code signals for ranging. These signals can be utilized in underwater ranges where existing bottom-mounted hydrophone receivers are used for tracking purposes.

Figure 7:
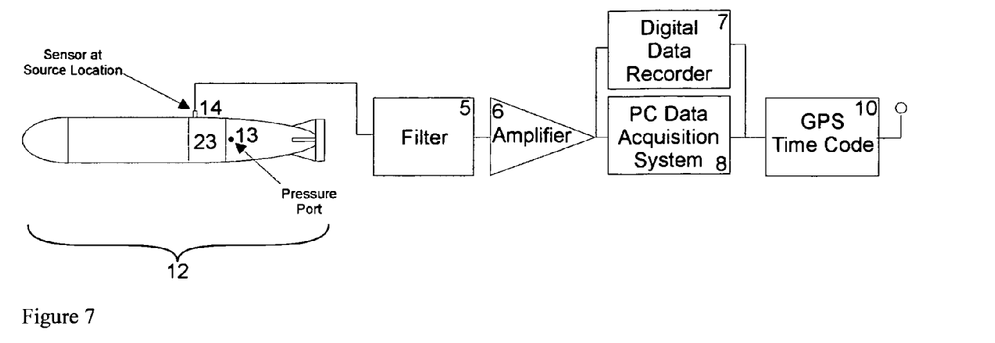
FIG. 7 is a similar diagram incorporating a vehicle clock time-synchronization configuration as for surface deployment.

After the vehicle 12 is programmed, in accordance with the methodology of the present invention, it must be time-synchronized to the receive-end of the system. The system configuration during time-synching will vary depending on the method of deployment, surface or submarine. FIG. 7 shows the system configuration of the invention during the surface-deployed time-synching process. A sensor 14 is firmly affixed to the vehicle 12 at or near the position of the acoustic source 23. Typically, this sensor 14 is an accelerometer, but in principle a hydrophone with a submerged vehicle, a microphone or any other sensor capable of detecting the acoustic signal can be used. The vehicle 12 is then activated, and begins transmitting one "in-air" ping every minute. These pings are the same pre-programmed acoustic signals that the vehicle 12 will transmit after launch, but the propulsion system is not yet activated.

Once received at the sensor 14, the signal is filtered and amplified (or attenuated) and continuously recorded digitally along with the GPS time code. Both signals are also digitized and saved to disk by the PC-based data acquisition system 8. After the final "in-air" ping has been digitized and saved, the time synching software performs matched-filter processing on the data and prompts the user to identify the peak of the matched-filter output. The seconds-after-the-minute obtained from the GPS time code that corresponds to this peak is taken to be the transmission time for that particular ping. This process is repeated for each "in-air" ping and the mean "in-air" transmission time is taken to be the transmission time of the vehicle 12. After the pre-programmed number of "in-air" pings has been transmitted, the vehicle 12 must be launched. Once in the water, the vehicle 12 continues to transmit acoustic signals at a rate of one per minute in the above example.

Figure 8:
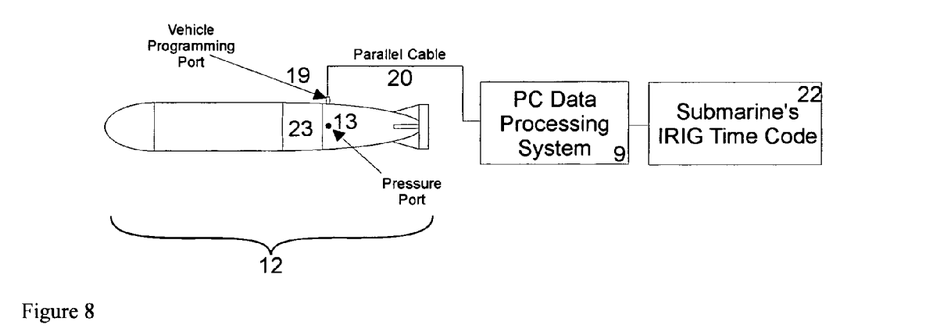
FIG. 8, on the other hand, illustrates vehicle clock time-synchronization for submarine-based deployment.

An alternative form for the time-synching is shown in FIG. 8, suitable for the submarine-launched version of the system. In this scenario, the vehicle 12, communicates with the data processing PC 9, through a parallel printer cable 20 connected to its programming port 19. The vehicle 12 transmits a square-wave pulse at a rate of one per minute. The PC 9 receives these pulses and determines the seconds-after-the-minute of each pulse. The transmit time of the vehicle 12 is then taken to be the mean of the square-wave transmit times. In contrast to the surface-launched version of the system, the vehicle 12 propulsion system is not activated immediately upon completion of the synch-pings. Rather, it determines when it has been launched through a combination of a change in vehicle orientation and an increased pressure at the pressure port 13, and only then activates its propulsion system.

Once the vehicle has been launched, however, the two systems, surface-launched or submarine-launched, converge. The data processing follows the flow chart shown in FIG. 9. To begin, the raw digitized data are read off of the data acquisition PC 8 hard drive and converted from volts to µPa. From there the data are demultiplexed to determine bearing if the receiver is a gradient hydrophone (DIFAR sonobuoy). Then the data are decimated from their original sampling rate (typically 50 kHz to capture the entire DIFAR signal frequency range) by a factor of, say, 16. Then the data are basebanded using a carrier frequency and bandwidth equal to the center frequency and the bandwidth of the transmitted HFM slide, respectively. After this, the basebanded signal is decimated again by a factor of eight. From here, the signal is matched-filtered.

Figure 9:
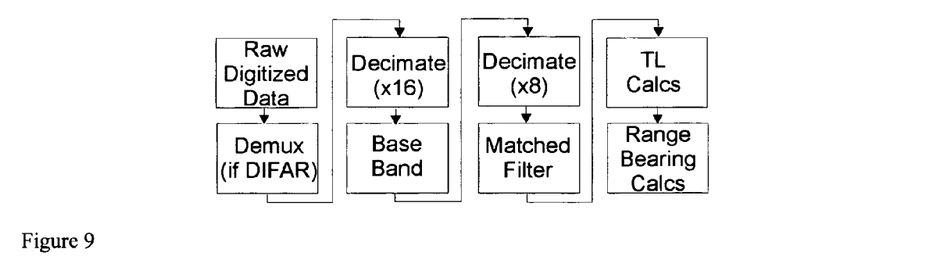
FIG. 9 presents a flowchart of the system software implementing the operation of the basic system of the invention.

The match-filter output is analyzed to determine both the peak TL and the integrated TL. The peak TL is computed from the peak of the matched-filter output. Integrated TL is taken to be the TL at the peak of the integrated matched filter output. Integration occurs typically over, for example, a 500-msec sliding window or one chosen by the user. If any CWs are present in the signal, they are examined for TL and Doppler shift. Then range is calculated from the difference between the transmit and receive times and a nominal sound speed (typically 1500 m/s). Bearing is calculated from the relative levels of the demultiplexed north/south and east/west signals obtained from the DIFAR sonobuoy. In addition, mean and standard deviation of both the integrated and non-integrated noise are calculated. This analysis is performed on each received acoustic transmission in near-real-time (with a latency of about 2-3 minutes) and the results are saved in a separate output file.

In the case of an array of hydrophones, each beam output from the beamformer is analyzed. That beam having the greatest received level is taken to be the target beam and all other data (TL, range, etc.) are calculated using that beam time series.

Software Implementation

Figure 10:
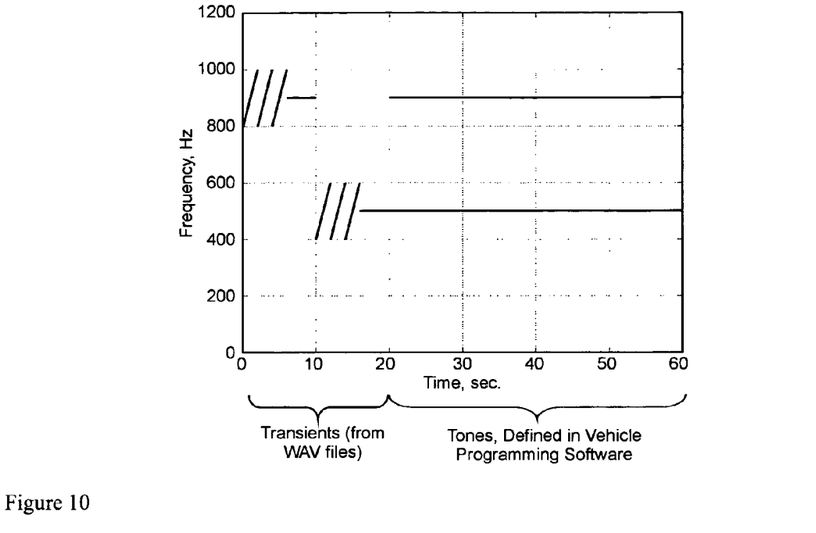
FIG. 10 is a time diagram represented as a function of frequency in Hz, in the before-described preferred low frequency range operation of the invention for its purposes (about 400 to 1000 Hz range on the diagram) and illustrating a sample or typical acoustic source transmission schedule of operation herein.

An acoustic signal plan recently used at sea is shown in FIG. 10, a time/frequency plot. The first 20 seconds are referred to as "transients" and are loaded to the vehicle as described above in two-second WAV files. The last forty seconds are referred to as "tones" and are defined using the vehicle programming software by entering the frequency and source level.

There is a significant amount of software related to the system of the invention in order to perform the methodology of the system operation—both in the areas of data acquisition and in data processing and post-processing. This software will now be described. It consists of three separate, but related packages that perform the functions of data acquisition, real-time processing and post-processing of the moving vehicle acoustic transmissions.

The data acquisition software consists of two data entry panels and a vehicle time-synching module. The first data entry panel is used to enter information related to the data acquisition system itself. This includes factors such as sonobuoy receiver type, amplifier gain, hydrophone sensitivity, total number of receiver channels, and the sampling rate of the acquisition system. The second data entry panel enables the user to enter data that define the signal that will be transmitted by the vehicle 12. These data include the number and type of waveforms, currently including constant frequency waves (CW) and hyperbolic frequency modulated (HFM) sweeps, the center frequency of the wave, its bandwidth, source level and duration in seconds; and, if it is a sweep, the direction of the sweep, up or down. In the time-synching module, users enter data related to the data acquisition system to be used to obtain the "in-air" pings. These, as before noted, are pings that are transmitted by the vehicle 12 prior to the start-up of the vehicle propulsion system, specifically to provide an opportunity for time-synching. Once all of the "in-air" data acquisition parameters have been entered, the data acquisition is begun and the vehicle 12 is time-synched as described above. The mean transmit time is then calculated and transferred back to the primary sonobuoy data acquisition screen, which is then able to start recording data from the sonobuoy receivers 3. All data entered by the user, as well as the vehicle 12 transmit time measured in the time-synching module is saved in one of two output files that will be accessed by the real-time processing module of the software.

The second software package associated with the system of the invention is the real-time acoustic data processing module, which typically runs on a separate PC 9 that is networked to the data acquisition PC 8. This panel requires users to input the vehicle name (typically its serial number) and a run name (defined previously in the data acquisition module). Given this information, the software then loads the data describing the data acquisition system and the acoustic transmission from the output files produced by the data acquisition software. The software then loads the binary data files containing the acoustic time series that were recorded by the data acquisition software and performs the matched-filter processing on them. It then attempts to locate the peak level of the matched-filter output time series. The software then allows the user to confirm that its choice is correct or to specify some other point as the peak. Having noted that the peak of the matched-filter output is not necessarily coincident with the first arrival of the signal, the software then prompts the user to select the first arrival time of the pulse. This point is then used to calculate the range of the vehicle using the equation $$R=c(Tr-Tx),$$

where R is the range, c is the nominal sound speed, Tr is the receive time of the signal and Tx is the transmit time. If the receiver is a directional sonobuoy, the software determines the bearing of the vehicle 12 for each transmission. The software then performs a 500 msec sliding integration of the matched-filter output time series and selects the peak of this integrated time series as the before-mentioned "Integrated TL." Peak and integrated noise are also calculated and saved in order to have a record of the signal-to-noise ratios. All of this information is provided graphically in near-real-time (with a latency of on the order of two to three minutes) to the operator. All data are saved to disk for later use by the post-processing module.

That post-processing software package first concatenates the output files (if there are more than one) produced by the near-real-time processor. It then concentrates on refining the position of the vehicle at each ping. First, the range and bearing are smoothed. This is done using an algorithm that does a forward bearing/range recomputation followed by a backward bearing/range recomputation. When the range between points exceeds the capability of the vehicle (based on the known vehicle speed), the range to the receiver is assumed correct and the bearing to the receiver is recomputed. If the vehicle can't reach the next measured range value at any recomputed bearing, the range is recomputed with the bearing to the receiver held constant. The average of forward and backward recomputed values is used in order to eliminate bias. Finally, in the event that more than a single receiver is present, triangulation is employed to further refine the vehicle position. Combining smoothed vehicle range and bearing with GPS data from each receiver, the software is able to calculate the latitude and longitude of the vehicle at any point in time.

Having thus refined the vehicle position, the post-processing software then provides the user with the opportunity to divide the run up into tracks and examine the TL data on a track-by-track basis. Users can plot TL versus either range or bearing. Typically, if the vehicle 12 has been programmed to perform long, linear run geometries, TL versus range is more useful. If the vehicle has been programmed to perform circular tracks around the receiver, TL versus bearing is more useful.

Experimental Results

Figure 11:
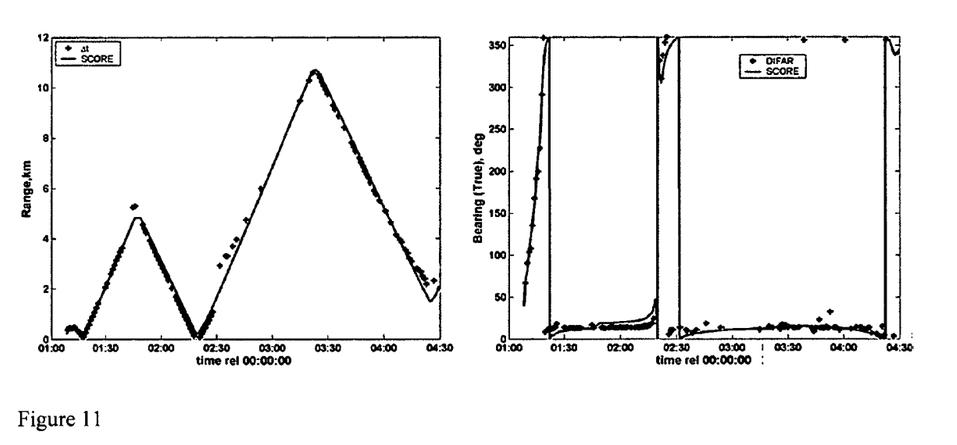
Figure 12:
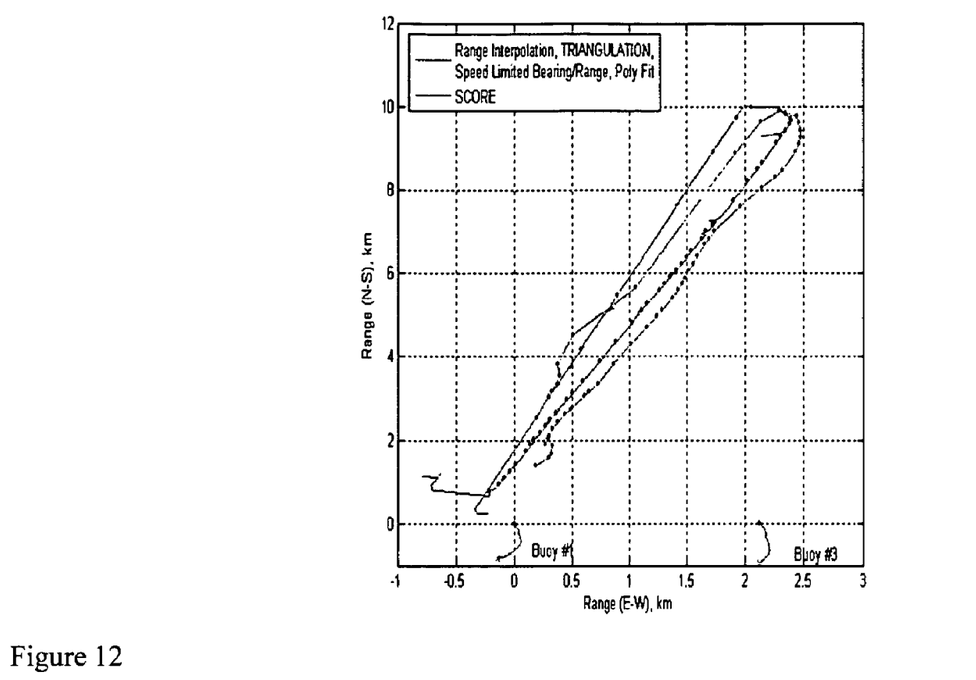
FIG. 12 comparing vehicle track measurements (using triangulation) with independent SCORE range tracking system measurements.

FIG. 11 presents an example of the system measured range and bearing of the vehicle 12 compared with the ground truth as measured by a three-dimensional tracking system at the Southern California Offshore Range (the previously mentioned SCORE). In this case, the system used a pair of co-located gradient hydrophone receivers (DIFAR sonobuoys). The range calculated from the time delay agrees closely with the ground truth range. The bearing also agrees well. FIG. 12 shows vehicle 12 tracks reconstructed using triangulation from two sets of receivers, each providing range and bearing, compared with the ground truth SCORE range reconstruction, with excellent agreement.

Because the preprogrammed navigation controls the vehicle 12 are based on dead reckoning, sub-surface currents can push it off its intended course. In order to reconstruct the vehicle 12 track accurately, it is important to have horizontal aperture so that the actual bearing can be well resolved. In one test, using elements from a vertical line array in conjunction with omnidirectional hydrophones (with a large separation distance between the array and hydrophones), a significant improvement was demonstrated in estimating the tracks of the vehicle 12.

Figure 13:
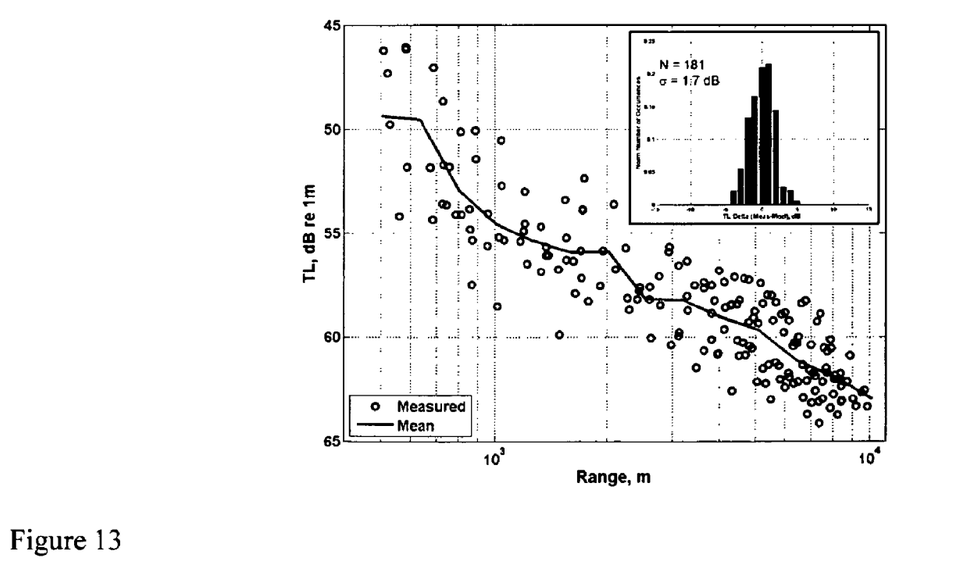
FIG. 13 presenting an illustrative example of system (integrated) TL measurements as a function of range, and with a histogram of TL fluctuations.

TL data measured in real-time during an experiment in shallow water (along an 80 m isobath) near the New Jersey Shelf Hudson Canyon area, during summer conditions (downward refracting sound speeds) are shown in FIG. 13. For each ping transmission sequence, the matched-filter output was integrated over 500 msec to obtain the "Integrated" (or energy) TL. Note that each data point has at least 5 dB SNR; those less than this are not plotted. For this particular test, two HFM slides were included in each ping transmission so there are two TL measurements for each one minute transmission, resulting in a large sample set (N=181 samples). For this experiment, the vehicle 12 operated for 3 hrs and was forced to finish early. Operating at 2.5 m/s, the vehicle's life expectancy is approximately 8 hrs. Thus, the potential number of samples for this particular configuration is almost three times greater than that actually acquired. Each HFM slide transmitted had a pulse width of 2 sec, with a frequency range of 800 to 1,000 Hz. Also shown in the figure is the mean TL ($\mu_{TL}$), which is an average of all TL data within ⅓ octave range windows, and the corresponding histogram of the TL fluctuations about the mean. The histogram has a standard deviation ($\sigma_{TL}$) of 1.7 dB. This may reflect the macrostate of the ocean and the bottom environment, whereas fluctuations in TL as measured by $\sigma_{TL}$ are related to the environmental microstate. For sonar performance predictions, determination of $\mu_{TL}$ is important because it sets the range-wise centroid of the limit to performance, while $\sigma_{TL}$ is an input to the range-wise window of the limit.

Further modifications, variations, and other implementations of the invention described herein will occur to those of ordinary skill in the art without departing from the spirit and the scope of the invention as defined in the appended claims.

What is claimed is:

1. A method of monitoring the acoustic transmission conditions in underwater areas using an unmanned, mobile, vehicle of the type including a source of acoustic signals, the method comprising:
controlling a vehicle so that vehicle traverses a desired path through the water of an area of interest; and
as the vehicle traverses the desired path, transmitting a time-synchronized acoustic signal from the acoustic source to at least one receiver spaced from the submersible vehicle so as to generate data representing the acoustic properties of the environment in the water between the acoustic source and the at least one receiver as the vehicle traverses the desired path.

2. The method according to claim 1, wherein the acoustic source is time-synchronized with the at least one receiver prior to traversal of the vehicle along the desired path.

3. The method according to claim 1, further comprising calibrating the source level and directivity of the acoustic source prior to traversal of the vehicle along the desired path.

4. The method according to claim 1, wherein the data generated further includes data representing the location of the vehicle.

5. The method according to claim 1, wherein the data generated further includes data representing the bearing of the vehicle.

6. The method according to claim 1, wherein the data representative of the acoustic properties of the environment in the water includes data representing the transmission loss of acoustic signals transmitted between the vehicle and the at least one receiver.

7. The method according to claim 1, wherein the data representative of the acoustic properties of the environment in the water includes at least one of the following:
transmission loss, channel impulse response, and bottom geoacoustic properties of the area between the path traversed by the vehicle and the at least one receiver.

8. The method according to claim 1, wherein the data representative of acoustic properties of the environment includes data representing at least one of the following:
measurement of the geoacoustic properties of the seafloor, sonar operating training data, sonar system calibration, in-situ sound pressure level measurements of unknown target sound sources, and inputs of model/data assimilation.

9. The method according to claim 1, wherein the time-synchronized acoustic signal is further adapted and configured for use in determining the accuracy and limitations of an anti-submarine warfare tracking device including sonar equipment.

10. The method according to claim 1, wherein the time-synchronized acoustic signal includes at least one specialized waveform configured so as to generate data representing ground truth for determining performance in anti-submarine warfare operations.

11. The method according to claim 1, wherein the vehicle is submersible and transverses the path underwater.

12. The method according to claim 1, wherein transmitting includes transmitting the acoustic signal using a high-speed clock.

13. The method according to claim 1, further including optimizing the acoustic source and the time-synchronization for surface deployment of the vehicle.

14. The method according to claim 13, further including transmitting the time-synchronized acoustic signal from the acoustic source to a plurality of receivers spaced from the submersible vehicle and from one another.

15. The method according to claim 14, further deploying the plurality of receivers as omni-directional sonobuoys.

16. The method according to claim 14, further deploying the plurality of receivers as gradient sonobuoys.

17. The method according to claim 14, further deploying the plurality of receivers as bottom mounted arrays.

18. The method according to claim 14, further deploying the plurality of receivers as bottom mounted horizontal arrays.

19. The method according to claim 14, further deploying the plurality of receivers as bottom mounted vertical arrays.

20. The method according to claim 14, further deploying the plurality of receivers as submarine sonar arrays.

21. The method according to claim 14, further deploying the plurality of receivers as sonar arrays towed by the vehicle.

22. A system for generating data representing the acoustic properties of the environment in a body of water, comprising:
an unmanned, mobile, vehicle including:
a control system for controlling the movement of the vehicle so that the vehicle can traverse a desired path through the water in an area of interest; and
a source of acoustic signals configured and arranged to transmit a time-synchronized acoustic signal to at least one receiver spaced from the submersible vehicle as the submersible vehicle traverses the desired path so as to generate data representing the acoustic properties of the environment in the water between the acoustic source and the at least one receiver as the submersible vehicle traverses the desired path.

23. The system according to claim 22, wherein the source of acoustic signals is configured so that it is time-synchronized with the at least one receiver prior to traversal of the vehicle along the desired path.

24. The system according to claim 22, wherein the source of acoustic signals is configured so that it is the source level and directivity of the acoustic signals is calibrated prior to traversal of the vehicle along the desired path.

25. The system according to claim 22, wherein the data generated further includes data representing the location of the vehicle.

26. The system according to claim 22, wherein the data generated further includes data representing the bearing of the vehicle.

27. The system according to claim 22, wherein the data representative of the acoustic properties of the environment in the water includes data representing the transmission loss of acoustic signals transmitted between the vehicle and the at least one receiver.

28. The system according to claim 22, wherein the data representative of the acoustic properties of the environment in the water includes at least one of the following:
transmission loss, channel impulse response, and bottom geoacoustic properties of the area between the path traversed by the submersible vehicle and the at least one receiver.

29. The system according to claim 22, wherein the data representative of acoustic properties of the environment includes data representing at least one of the following:
measurement of the geoacoustic properties of the seafloor, sonar operating training data, sonar system calibration, in-situ sound pressure level measurements of unknown target sound sources, and inputs of model/data assimilation.

30. The system according to claim 22, wherein source of acoustic signal is adapted and configured to broadcast specialized waveforms for use in determining the accuracy and limitations of an anti-submarine warfare tracking device including sonar equipment.

31. The system according to claim 30, wherein the time-synchronized acoustic signal includes at least one specialized waveform configured so as to generate data representing ground truth for determining performance in anti-submarine warfare operations.

32. The system according to claim 22, wherein the vehicle is submersible and is controlled so as to transverse the path underwater.

33. The system according to claim 22, wherein the source of acoustic signals includes a high-speed clock.

34. The system according to claim 22, wherein the source of acoustic signals and the time-synchronization are configured so that the vehicle can be surface deployed.

35. The system according to claim 22, further including a plurality of receivers disposed in the water, spaced from the path of the vehicle and from each other, wherein the source of acoustic signals is configured to generate the time-synchronized acoustic signal from the acoustic source to the plurality of receivers.

36. The system according to claim 35, wherein the plurality of receivers includes omni-directional sonobuoys.

37. The system according to claim 35, wherein the plurality of receivers includes gradient sonobuoys.

38. The system according to claim 35, wherein the plurality of receivers includes bottom mounted arrays.

39. The system according to claim 35, wherein the plurality of receivers includes bottom mounted horizontal arrays.

40. The system according to claim 35, wherein the plurality of receivers includes bottom mounted vertical arrays.

41. The system according to claim 35, wherein the plurality of receivers includes submarine sonar arrays.

42. The method according to claim 14, wherein the plurality of receivers are sonar arrays coupled to and towed by the vehicle through the water along the path.

* * * * *